United States Patent [19]
Pfister et al.

[11] 3,859,442

[45] Jan. 7, 1975

[54] A METHOD OF INHIBITING SYMPTOMS OF ASTHMA

[75] Inventors: Jurg R. Pfister, Los Altos; Ian T. Harrison; John H. Fried, both of Palo Alto, all of Calif.

[73] Assignee: Syntex (U.S.A.) Inc., Palo Alto, Calif.

[22] Filed: Nov. 8, 1973

[21] Appl. No.: 413,978

Related U.S. Application Data
[62] Division of Ser. No. 174,260, Aug. 23, 1971, abandoned.

[52] U.S. Cl. ............................................. 424/283
[51] Int. Cl. ........................................... A61k 27/00
[58] Field of Search ..................................... 424/283

[56] References Cited
UNITED STATES PATENTS

| | | | |
|---|---|---|---|
| 3,642,997 | 2/1972 | Shen et al. | 424/250 |
| 3,678,077 | 7/1972 | Nakanishi | 424/278 |
| 3,706,768 | 12/1972 | Bays | 424/283 |

Primary Examiner—Albert T. Meyers
Assistant Examiner—Norman A. Drezin
Attorney, Agent, or Firm—Gerard A. Blaufarb; Lawrence S. Squires; William B. Walker

[57] ABSTRACT

Compounds containing and method employing, as the essential ingredient, novel substituted xanthone carboxylic acid compound which are useful in the treatment of allergic conditions. Method for preparing these compounds and compositions and intermediates therein are also disclosed. 7-Trifluoromethylxanthone-2-carboxylic acid is illustrated as representative of the class.

6 Claims, No Drawings

A METHOD OF INHIBITING SYMPTOMS OF ASTHMA

This application is a division of application Ser. No. 174,260, filed Aug. 23, 1971, now abandoned.

The present invention is directed to novel substituted xanthone carboxylic acid compounds and to compositions containing and methods utilizing these compounds as the essential ingredient in the treatment of symptoms associated with allergic manifestations, for example, asthmatic conditions.

In a first aspect, the present invention relates to novel trifluoromethyl substituted xanthone carboxylic acid compounds selected from those represented by the following formula:

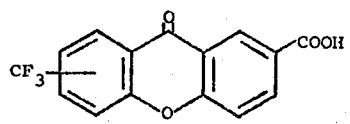

(A)

and the pharmaceutically acceptable, non-toxic esters, amides and salts thereof.

Thus included within the scope of the present invention are the C-5, C-6, C-7, and C-8 monosubstituted trifluoromethylxanthone-2-carboxylic acid compounds and the pharmaceutically acceptable, non-toxic esters, amides and salts thereof. Particularly preferred are the C-5 and C-7 monosubstituted compounds.

In a second aspect, the present invention is directed to a method useful for relieving symptoms associated with allergic manifestations such as are brought about by antigenantibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented by the following formula:

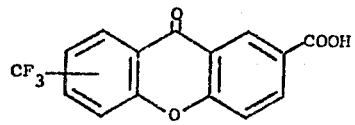

and the pharmaceutically acceptable non-toxic esters, amides, and salts thereof; or a pharmaceutically acceptable non-toxic composition incorporating said acids, esters, amides or salts as an essential ingredient.

The present invention, in a third aspect, is directed to pharmaceutical compositions useful for inhibiting the effects of the allergic reaction comprising an effective amount of a compound selected from those represented by the following formula:

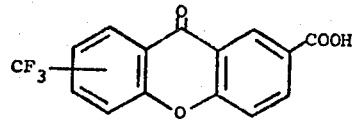

and the pharmaceutically acceptable esters, amides, and salts thereof; in admixture with a pharmaceutically acceptable non-toxic carrier.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered topically, parenterally, by inhalation, and preferably orally, in the form of either solid, liquid, or gaseous dosages including tablets, suspensions, and aerosols, as discussed in more detail hereinafter. The administration can be conducted in single unit dosage form with continuous therapy or in single dose therapy ad libitum, preferably prophylactically.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969).

The compounds of the present invention can be prepared in accordance with the following reaction sequence:

Sequence A

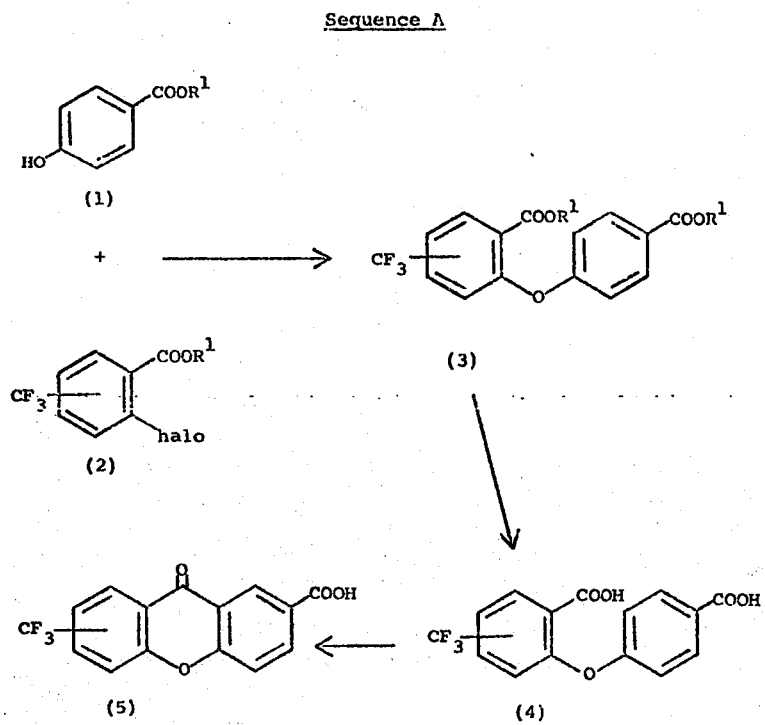

wherein $R^1$ is lower alkyl, preferably methyl; and halo is bromo, chloro, fluoro, or iodo, preferably chloro.

With reference to the above reaction sequence, a trifluoromethyl substituted o-halobenzoic acid ester (2) is condensed with the parahydroxybenzoic acid ester (1) in the presence of cuprous oxide optionally in organic liquid reaction medium, preferably an organic amide such as dimethyl acetamide, dimethyl formamide, N-methylpyrrolidone, tetramethylurea, and so forth, to prepare the corresponding diphenyl ether derivative (3).

The reaction is preferably conducted in an inert organic reaction medium, such as those listed above, or suitable mixtures of one or more of such medium. The reaction is further conducted at temperatures ranging from about 80° to about 220°C., preferably from about 120° to 200°C., and for a period of time sufficient to complete the reaction, ranging from about 2 hours to about 24 hours.

The reaction consumes the reactants on the basis of one mole of compound (1) per mole of compound (2) per half mole of cuprous oxide. However, the amounts of the reactants to be employed are not critical, some of the desired compound (3) product being obtained when employing any proportions thereof. In the preferred embodiments, the reaction is conducted by reacting from about 1 to about 3 moles of the compound (2) with about from 1 to about 1.2 moles of compound (1) in the presence of from about 0.5 to about 0.6 moles of the cuprous oxide. The inert organic reaction medium, if employed, is used in solvent amounts.

Thereafter, the prepared compound (3) is base hydrolyzed to give the corresponding dicarboxylic acid (4). The base hydrolysis conditions can be any employed conventionally in the art. Generally, the hydrolysis reaction is conducted using an alkali metal hydroxide at about 50° to about 90°C. and for a period of time sufficient to complete the reaction, ranging from about 15 minutes to about 60 minutes, preferably in the presence of inert organic reaction media such as those normally employed in organic chemical reactions of this type, e.g., aqueous alkanol solutions. Although 2 moles of base are required per mole of compound (3), the amounts employed are not critical to produce the desired hydrolysis. Preferably from about 3 to about 5 moles of base are employed per mole of compound (3) and the reaction media, if employed, are used in solvent amounts.

The thus prepared diacid compound (4) is then cyclized with phosphoryl chloride, thionyl chloride, sulfuric acid, hydrogen fluoride, or, preferably, polyphosphoric acid (PPA), to give the corresponding trifluoromethyl substituted xanthone-2-carboxylic acid compound (5). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C., and for a period of time sufficient to complete the reaction ranging from about 15 minutes to about 90 minutes.

Although the reaction consumes the reactants on the basis of one mole of compound (4) per mole of cyclizing reagent, the reaction can be performed using any proportions of reactants. In the preferred embodiments, however, the reaction is conducted using from about 20 to about 50 moles of cyclizing reagent per mole of starting compound (4).

Alternative methods for the preparation of the compounds (5) hereof are represented as follows:

Sequence B

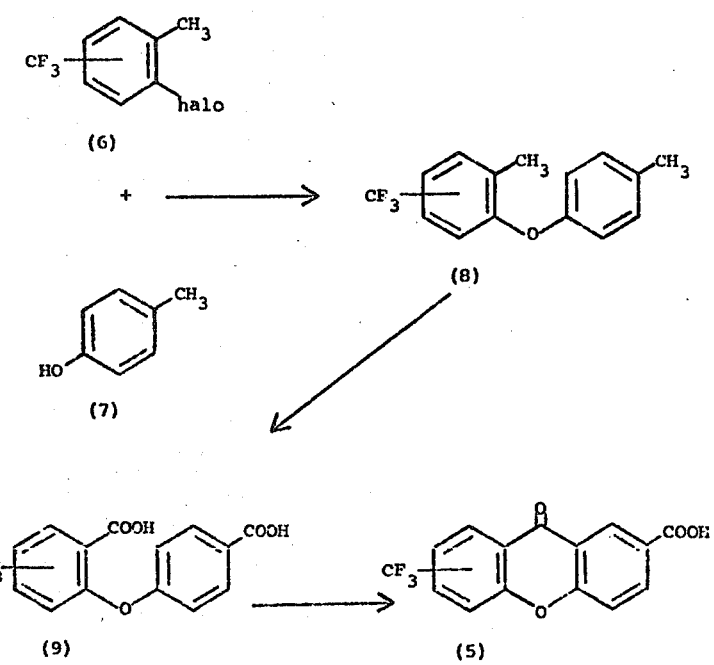

wherein halo is as defined above.

Sequence C

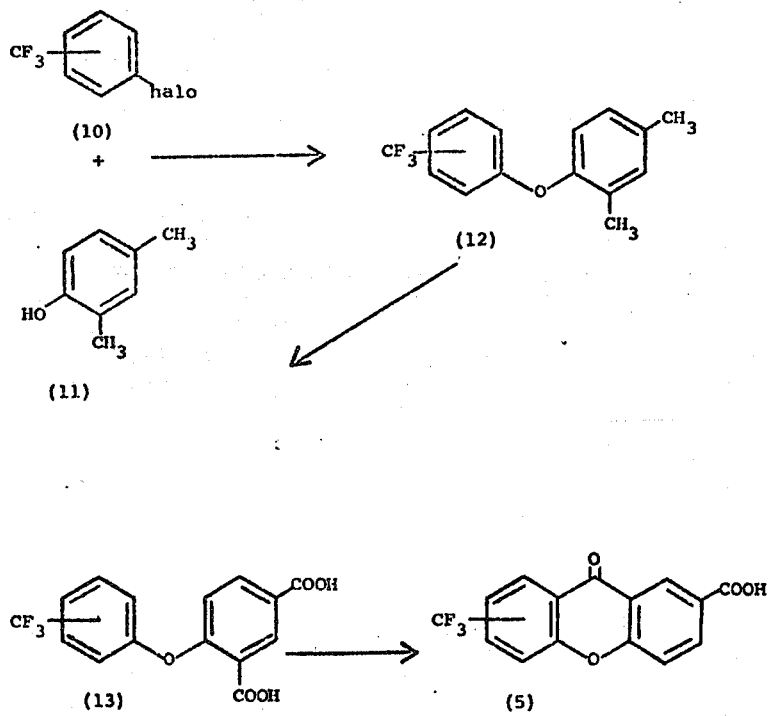

wherein halo is as defined above.

With reference to the above sequences, an appropriate phenol (7) or (11) is treated with the trifluoromethyl-halo-(preferably iodo) benzene (6) or (10), as described above, to prepare the corresponding dimethyltrifluoromethyl derivative (8) or (12). This compound is then oxidized such as with potassium permanganate in aqueous t-butanol, to give the corresponding dicarboxylic acid (9) or (13). This compound is then cyclized, as described above, to give the corresponding trifluoromethylxanthone-2-carboxylic acids (5).

The starting trifluoromethyl-halo-benzoic acid esters (2) are prepared as follows:

Sequence D

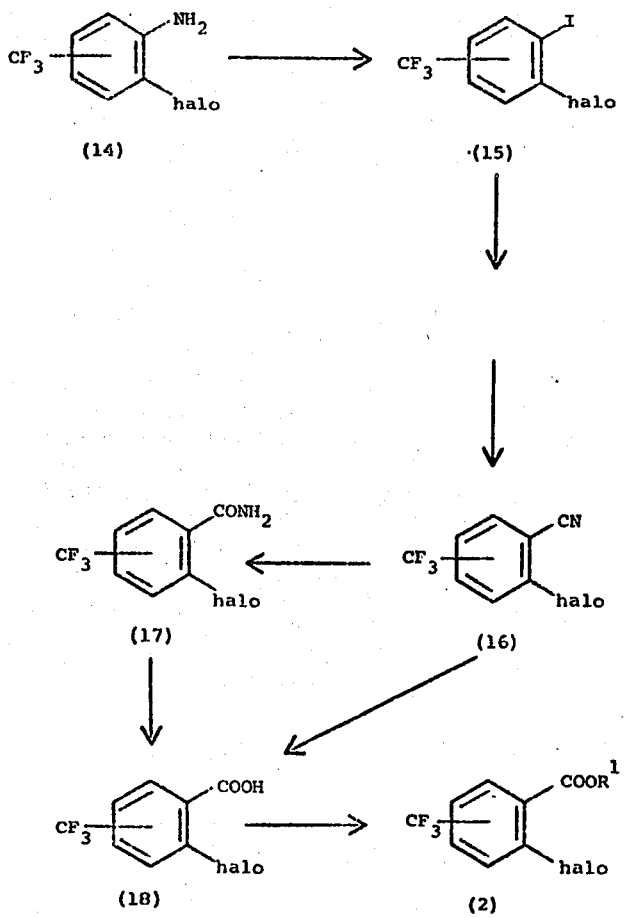

wherein each of halo and $R^1$ is as defined above.

With reference to the above reaction sequence, an aminohalotrifluoromethylbenzene (14) is reacted with sodium nitrite under acidic conditions followed by treatment with sodium or potassium iodide to give (15). This compound is treated with cuprous cyanide to give the corresponding cyano compound (16) which is oxidized with hydrogen peroxide in base such as sodium hydroxide to give the amido compound (17). Hydrolysis thereof under base conditions, as described above, (i.e. 3 → 4), affords the corresponding acid compound (18) which is conventionally esterified to give (2). Alternatively, compound (16) is directly converted to compound (18) by treatment with base, such as sodium hydroxide, preferably in aqueous ethanol.

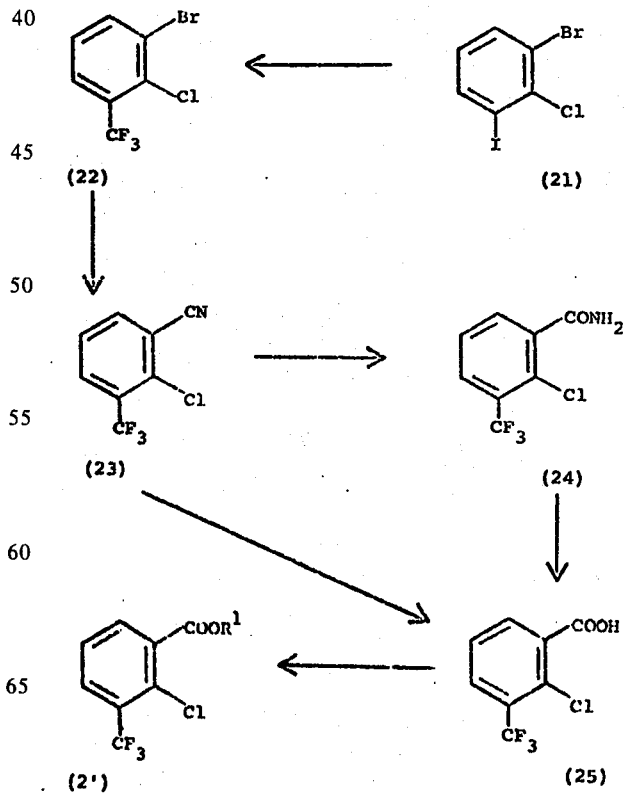

Sequence E

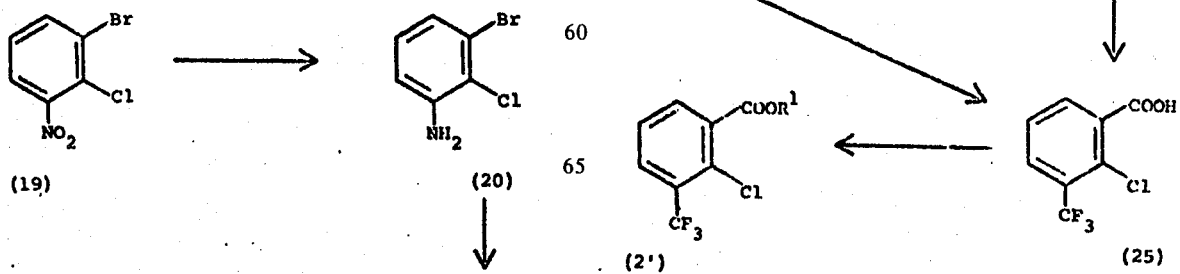

With reference to Sequence E, compound (19) is treated with stannous chloride in acid to afford the amino compound (20) which is treated as above described (i.e., 14 → 15) to give the corresponding iodo compound (21). Treatment of the latter with copper powder and trifluoroiodomethane in organic solvent provides the trifluoromethyl compound (22) which is treated with cuprous cyanide as above described (i.e. 15 → 16) to give compound (23). Thereafter, compound (23) is treated with hydrogen peroxide, base and esterifying agent, as described above (i.e., 16 → 17 → 18 → 2), to give the corresponding starting compound (2').

Sequence F

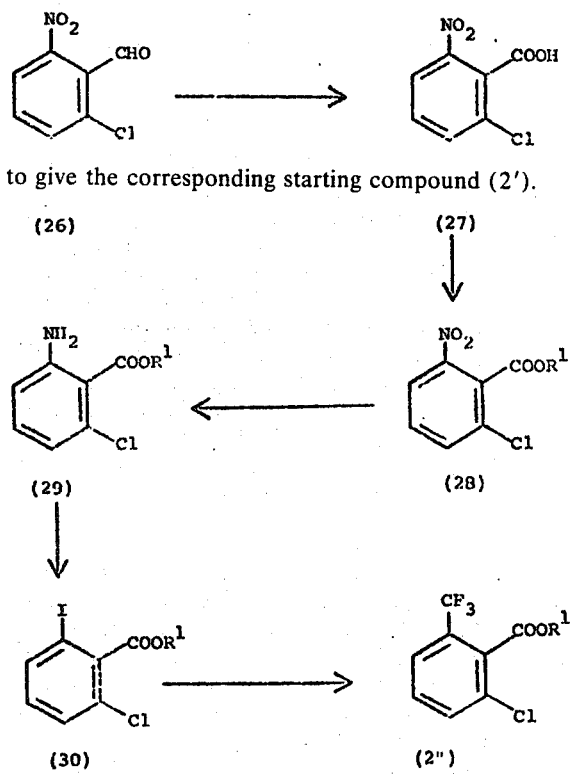

to give the corresponding starting compound (2').

With reference to Sequence F, the aldehyde (26) is oxidized with potassium permanganate, as described above (e.g. 8 → 9 or 12 → 13) to give the acid (27). The acid group thereof is esterified (28), the nitro group is reduced (29), the resultant amino group converted to an iodo group (30), which is replaced with a trifluoromethyl group, all as described above, to give the starting compounds (2'').

Each of these reactions is known per se and have been described, for example, see Wagner and Zook, *Synthetic Organic Chemistry;* John Wiley and Sons, Inc., New York, 1953.

The acid esters of the xanthone-2-carboxylic acids hereof are prepared, as described above, upon treatment of the acid with ethereal diazoalkane such as diazomethane and diazoethane or with the desired lower alkyl iodide in the presence of lithium carbonate at room temperature or with the desired lower alkanol in the presence of a trace of sulfuric acid at reflux.

The amides are prepared by treatment of the acids with thionyl chloride followed by treatment with anhydrous ammonia or lower alkyl or dilower alkyl amine.

The salts of the xanthone-2-carboxylic acids hereof are prepared by treating the corresponding acids with pharmaceutically acceptable base. Representative salts derived from such pharmaceutically acceptable bases include the sodium, potassium, lithium, ammonia, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)-ethanol, arginine, lysine, histidine, N-ethylpiperdine, hydrabamine, choline, betaine, ethylenediamine, glucosamine, methyl glucamine, theobromine, purines, piperazine, piperidine, polyamine resins, caffeine, and procaine salts. The reaction is conducted in an aqueous solution, alone or in combination with an inert water miscible organic solvent, at a temperature of from about 0° to about 100°C., preferably at room temperature. Typical inert water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one molar equivalent of pharmaceutically acceptable base. When the aluminum salts of the acids are prepared, about 1 molar equivalent of the pharmaceutically acceptable base are employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20° to about 100°C.

In the preferred embodiment of the present invention, the aluminum salts of the acids are prepared by treating the acids with at least one molar equivalent of an aluminum alkoxide, such as aluminum triethoxide, aluminum tripopoxide and the like, in a hydrocarbon solvent, such as benzene, xylene, cyclohexane, and the like, at a temperature of from about 20° to about 115°C.

In the present specification and claims, by the term "lower alkyl" is intended a lower alkyl group containing 1 to 5 carbon atoms including straight and branched chain groups and cyclic alkyl groups, for example, methyl, ethyl, n-propyl, isopropyl, n-butyl, isobutyl, sec-butyl, t-butyl, n-pentyl, isopentyl, sec-pentyl, t-pentyl, cyclopropyl, cyclobutyl, and cyclopentyl. By the term "lower alkoxy" is intended the group "O-lower alkyl" wherein "lower alkyl" is as defined above.

By the term "pharmaceutically acceptable, non-toxic esters, amides, and salts" is respectively intended a "lower alkyl" ester, "lower alkyl" being as defined above; as unsubstituted, monolower alkyl, or dilower alkyl substituted amide, "lower alkyl" being as defined above; and a salt as defined above.

The following preparations and examples illustrate the method by which the present invention can be practiced.

Preparation 1

1. To 100 g. of 2-chloro-5-trifluoromethylaniline in 600 ml. of water is slowly added 335 g. of concentrated sulfuric acid. The mixture is cooled to 0°–5°C. and a solution of 37.5 g. of sodium nitrite in 140 ml. of water is slowly added thereto. After stirring a further 1 hour at 0°–5°C., 92 g. of potassium iodide in 140 ml. of water is added and the mixture stirred overnight at about 20°C. Extraction with ether and distillation gives 1-chloro-2-iodo-4-trifluoromethylbenzene.

2. A mixture of 110 g. of 1-chloro-2-iodo-4-trifluoromethylbenzene and 39 g. of cuprous cyanide in 300 ml. of N-methylpyrrolidone is heated at 175°C. for 6 hours. To the cooled mixtured is added 200 g. of ferric chloride in 600 ml. of 2N hydrochloric acid (to decompose complex of product and CuCN) and the resultant mixture extracted with diethyl ether and the extracts concentrated to give 1-chloro-2-cyano-4-trifluoromethylbenzene.

3. A mixture of 14.5 g. of 1-chloro-2-cyano-4-trifluoromethylbenzene, 30 ml. of 30 percent hydrogen peroxide, 30 ml. of 6N sodium hydroxide, and 100 ml. of ethanol is stirred for 4 hours at 50°C. The mixture is then concentrated in vacuo and 600 ml. of water is added slowly thereto. The precipitate is filtered off, washed and dried to give 1-chloro-2-carbamoyl-4-trifluoromethylbenzene.

4. A mixture of 5.7 g. of 1-chloro-2-carbamoyl-4-trifluoromethylbenzene, 10 g. of potassium hydroxide, and 100 ml. of 80 percent ethanol is refluxed for 5 hours. The mixture is concentrated in vacuo, acidified, and extracted with ether to give 1-chloro-2-carboxy-4-trifluoromethylbenzene.

5. A mixture of 45.1 g. of 1-chloro-2-carboxy-4-trifluoromethylbenzene and excess methyl iodide and excess potassium carbonate in 350 ml. of dimethylformamide is stirred at 60°C. for 4 hours. After this time, it is poured into ice (dil HCl) and extracted. The extracts are chromatographed to give 1-chloro-2-carbomethoxy-4-trifluoromethylbenzene.

In like manner, 1-bromo-2-carbomethoxy-5-trifluoromethylbenzene and 1-chloro-2-carbomethoxy-4-trifluoromethylbenzene are prepared from the corresponding carboxy compounds.

The foregoing procedures are repeated with the starting compounds of Column A below to give the respective products of Column B below:

Column A 2-chloro-3-trifluoromethylaniline,
2-chloro-4-trifluoromethylaniline,
2-chloro-6-trifluoromethylaniline, or
the corresponding 2-bromo compounds.

Column B 1-chloro-2-carbomethoxy-6-trifluoromethylbenzene,
1-chloro-2-carbomethoxy-5-trifluoromethylbenzene,
1-chloro-2-carbomethoxy-3-trifluoromethylbenzene,
  or the corresponding 2-bromo compounds.

Preparation 2

1. Four g. of 1-bromo-2-chloro-3-nitrobenzene in excess stannous chloride dispersed in 100 ml. of acetic acid containing 10 ml. of concentrated hydrochloric acid is stirred at room temperature for 5 hours. Sodium hydroxide is added thereto to a pH of about 10 and the resultant mixture extracted with ether. The extracts are concentrated to give 1-bromo-2-chloro-3-aminobenzene.

2. The thus obtained compound is treated in accordance with the procedure of the first paragraph of Preparation 1 to give 1-bromo-2-chloro-3-iodobenzene.

3. 100 Mg. of 1-bromo-2-chloro-3-iodobenzene, 200 mg. of copper powder, 1 ml. of dimethylformamide and 0.5 ml. of trifluoromethyl iodide in a sealed glass tube are heated to 135°C. for 3 hours. The products are extracted into hexane which is washed with water. Evaporation of the solvent gives 1-bromo-2-chloro-3-trifluoromethylbenzene.

4. The thus obtained compound is treated in accordance with the procedure of the second paragraph of Preparation 1 to give 1-cyano-2-chloro-3-trifluoromethylbenzene, thence in accordance with the procedures of the third, fourth, and fifth paragraph of preparation 1 to sequentially give 1-carbamoyl-2-chloro-3-trifluoromethylbenzene, 1-carboxy-2-chloro-3-trifluoromethylbenzene, and 1-carbomethoxy-2-chloro-3-trifluoromethylbenzene. (Alternatively, 1-chloro-2-carbomethoxy-6-trifluoromethylbenzene, the latter as prepared in Preparation 1.)

Preparation 3

A mixture of 12 g. of 1-chloro-2-formyl-3-nitrobenzenne, 24 g. of $K_2MnO_4$, 200 ml. of butanol, and 350 ml. of water is refluxed for 1 hour. Methanol is added to destroy excess permanganate. After this, the t-butanol is distilled off and the reaction mixture filtered. The filtrate is acidified to give 1-chloro-2-carboxy-3-nitrobenzene.

The thus obtained compound is esterified in accordance with the procedure of the fifth paragraph of Preparation 1 to give 1-chloro-2-carbomethoxy-3-nitrobenzene which is treated in accordance with the procedures of the first paragraph of Preparation 2, thence the procedure of the first paragraph of Preparation 1, and thence the procedure of the third paragraph of Preparation 2 to sequentially give 1-chloro-2-carbomethoxy-3-aminobenzene, 1-chloro-2-carbomethoxy-3-iodobenzene, and 1-chloro-2-carbomethoxy-3-trifluoromethylbenzene, the latter as prepared in Preparation 1.

Example 1

A mixture of 7.0 g. of 1-chloro-2-carbomethoxy-4-trifluoromethylbenzene, 7.0 g. of methyl 4-hydroxy benzoate, 2.1 g. of cuprous oxide, 30 ml. of tetramethylurea, and 45 ml. of N-methylpyrrolidone is stirred at 165°C. for 18 hours. The reaction is monitored by tlc (10% acetone/hexane). After this time, water is added and the resultant mixture extracted with ether. The extracts are concentrated and the residue filtered through 100 g. alumina (methylene chloride solution) to give 1-(4-carbomethoxyphenyloxy)-2-carbomethoxy-4-trifluoromethylbenzene.

Example 2

A mixture of 1 g. of 1-(4-carbomethoxyphenyloxy)-2-carbomethoxy-4-trifluoromethylbenzene in 50 ml. of 5% potassium hydroxide/ethanol is refluxed for 1 hour. After this time, the mixture is partially evaporated in vacuo. The concentrate is acidified, the precipitate filtered off and washed with water to give 1-(4-carboxyphenyloxy)-2-carboxy-4-trifluoromethylbenzene.

Example 3

A mixture of 1.5 g. of 1-(4-carboxyphenyloxy)-2-carboxy-4-trifluoromethylbenzene in 30 g. of sulfolane and 30 g. of polyphosphoric acid is stirred for 2 hours at 125°C. The mixture is then diluted with water, the precipitate filtered off and dissolved in ethanol/potassium hydroxide. The resultant mixture is treated with charcoal, filtered, and acidified to give 7-trifluoromethylxanthone-2-carboxylic acid.

The procedures of Examples 1 to 3 are practiced using an alternativve 1-chloro (or bromo)-2-carbomethoxy-trifluoromethylbenzene starting compound, as listed in Preparations 1, 2, and 3 to prepare the corresponding trifluoromethylxanthone-2-carboxylic acids, e.g. 5-trifluoromethylxanthone-2-carboxylic acid, 6-trifluoromethylxanthone-2- carboxylic acid, and 8-trifluoromethylxanthone-2-carboxylic acid.

Example 4

A mixture of 5 g. of 1-iodo-2-methyl-4-trifluoromethylbenzene, 3.5 g. of 4-methylphenol, 1.5 g. of cuprous oxide in 50 ml. of dimethylacetamide is heated to the boiling point and maintained under reflux for 12 hours with stirring and under a nitrogen atmosphere. The reaction mixture is then poured into ice water and extracted with ether and the extracts are filtered through 150 g. of alumina in hexane to give 1-(4-methylphenyloxy)-2-methyl-4-trifluoromethylbenzene.

A mixture of 2.5 g. of 1-(4-methylphenyloxy)-2-methyl-4-trifluoromethylbenzene, 8 g. of potassium permanganate, 70 ml. of t-butanol, and 70 ml. of water is heated to the boiling point and maintained thereat for a period of 3 hours. After distilling off the t-butanol, the reaction mixture is filtered, the clear filtrate acidified and the precipitate of 1-(4-carboxyphenyloxy)-2-carboxy-4-trifluoromethylbenzene is isolated by suction filtration and washed with water.

The compound thus prepared is then cyclized as described in Example 3 above to give 7-trifluoromethylxanthone-2-carboxylic acid.

Alternatively, the foregoing procedure can be practiced using 1-iodo-4-trifluoromethylbenzene and 2,4-dimethylphenol as starting compounds to give the same 7-trifluoromethylxanthone-2-carboxylic acid product.

In like manner, the foregoing procedures are employed to prepare the other trifluoromethylxanthone-2-carboxylic acids hereof, i.e., those listed in the last paragraph of Example 3.

Example 5

A mixture of 2 g. of 7-trifluoromethylxanthone-2-carboxylic acid, 5 g. of methyl iodide, and 5 g. of lithium carbonate in 50 ml. of dimethylformamide is stirred at room temperature for a period of 16 hours. After this period of time, the reaction mixture is poured into dilute hydrochloric acid-ice and the resultant precipitate is filtered off and washed to give methyl 7-trifluoromethylxanthone-2-carboxylate.

The foregoing procedure is repeated using the alternate lower alkyl iodides so as to prepare the corresponding lower alkyl acid esters hereof, e.g. ethyl 7-trifluoromethylxanthone-2-carboxylate, n-propyl 7-trifluoromethylxanthone-2-carboxylate, isopropyl 7-trifluoromethylxanthone-2-carboxylate, n-propyl 7-trifluoromethylxanthone-2-carboxylate, isobutyl 7-trifluoromethylxanthone-2-carboxylate, sec-butyl 7-trifluoromethylxanthone-2-carboxylate, t-butyl 7-trifluoromethylxanthone-2-carboxylate, n-pentyl 7-trifluoromethylxanthone-2-carboxylate and so forth.

In like manner, the other trifluoromethylxanthone-2-carboxylic acids hereof, prepared as described above, can be converted to the corresponding acid esters, e.g. methyl 5-trifluoromethylxanthone-2-carboxylate.

Example 6

To a solution of 10 g. of 7-trifluoromethylxanthone-2-carboxylic acid in 200 ml. of ethanol is added the theoretical amount of sodium hydroxide dissolved in 200 ml. of 90 percent ethanol. The reaction mixture is then concentrated in vacuum to give sodium 7-trifluoromethylxanthone-2-carboxylate.

In a similar manner, the potassium and lithium salts are prepared. By replacing the sodium salt by means of an appropriate metal salt reagent, e.g., calcium chloride, manganese chloride, and so forth, the other xanthone-2-carboxylic acid salts are prepared, e.g., magnesium 7-trifluoromethylxanthone-2-carboxylate, calcium 7-trifluoromethylxanthone-2-carboxylate, aluminum 7-trifluoromethylxanthone-2-carboxylate, ferrous 7-trifluoromethylxanthone-2-carboxylate, zinc 7-trifluoromethylxanthone-2-carboxylate, manganese 7-trifluoromethylxanthone-2-carboxylate, ferric 7-trifluoromethylxanthone-2-carboxylate, and so forth.

In a similar manner, the salts of the other trifluoromethylxanthone-2-carboxylic acids hereof are prepare, e.g., sodium 5-trifluoromethylxanthone-2-carboxylate.

Example 7

To a mixture of 50 ml. of concentrated aqueous ammonia in 500 ml. of methanol there are added 10 g. of 7-trifluoromethylxanthone-2-carboxylic acid. The resultant mixture is stirred for 2 hours and is then evaporated to dryness to give the ammonium salt of 7-trifluoromethylxanthone-2-carboxylic acid.

A solution of 2 g. of 5-trifluoromethylxanthone-2-carboxylic acid in 20 ml. of thionyl chloride is heated at reflux for 1 hour. Thereafter, the solution is evaporated to dryness to give the corresponding acid chloride to which is added a concentrated ethereal ammonia solution. The resulting solution is evaporated giving 5-trifluoromethylxanthone-2-carboxylic acid amide.

In like manner, the lower alkyl amides can be prepared using monoalkylamine or dialkylamine in lieu of ammonia in the above procedures. Thus prepared, e.g. are N-methyl 7-trifluoromethylxanthone-2-carboxylic acid amide, N,N-dimethyl-6-trifluoromethylxanthone-2-carboxylic acid amide, N,N-diethyl 8-trifluoromethylxanthone-2-carboxylic acid amide, and so forth.

Example 8

To a mixture of 20 g. of procaine and 500 ml. of aqueous methanol are added 20 g. of 8-trifluoromethylxanthone-2-carboxylic acid. The resultant mixture is stirred at room temperature for 16 hours. It is then evaporated under reduced pressure, to give the procaine salt of 8-trifluoromethylxanthone-2-carboxylic acid.

Similarly, the lysine, caffeine, and arginine salts thereof are obtained. In like manner, the procaine, lysine, caffeine, and arginine salts of the other trifluoromethylxanthone-2-carboxylic acids are obtained, e.g., the procaine salt of 7-trifluoromethylxanthone-2-carboxylic acid, the caffeine salt of 5-trifluoromethylxanthone-2-carboxylic acid, the lysine salt of 7-trifluoromethylxanthone-2-carboxylic acid, the procaine salt of 6-trifluoromethylxanthone-2-carboxylic acid, and the arginine salt of 5-trifluoromethylxanthone-2-carboxylic acid.

Example 9

The following procedures illustrate the method by which the pharmaceutical compositions of the compound hereof are prepared.

Sodium chloride (0.44 g.) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry 7-trifluoromethylxanthone-2-carboxylic acid to give a preparation suitable for intravenous injection containing 2.5 mg. of 7-trifluoromethylxanthone-2-carboxylic acid per ml. of total composition.

Example 10

The following procedure illustrates a test procedure for the compounds hereof.

Normal female (Sprague-Dawley) rats of 150 to 200 g. each are passively sensitized intradermally by injection of rat anti-egg albumin reaginic sera. After 24 hours, each rat is challenged intravenously with 1 ml. of 0.5 percent Evans blue, 1 mg. egg albumin plus 0.20 mg of 7-trifluoromethylxanthone-2-carboxylic acid. Control rats receive no 7-trifluoromethylxanthone-2-carboxylic acid. The dermal bluing is recorded 15 to 25 minutes later. The rats which receive the 7-trifluoromethylxanthone-2-carboxylic acid exhibit a 100 percent inhibition of allergic reaction whereas the control rats exhibit no inhibition.

The above procedure is repeated using 5-trifluoromethylxanthone-2-carboxylic acid, with similar results. The above procedure is repeated using oral administration, with similar results.

The trifluoromethylxanthone-2-carboxylic acid compounds are administered by gavage at a dose of 5 mg. per animal 15 minutes prior to challenge. 20 to 30 minutes after challenge the degree of dermal bluing is read, with similar results.

Inhibition of reaginic antigen-antibody reactions in rats is regarded as representative of inhibition of human reaginic antigen-antibody reactions which occur during allergic episodes.

Subjects challenged by antigen inhalation are measured for the extent of provoked degree of asthma condition by changes in airway resistance on expiration. The subject compounds are administered as an aerosol by inhalation before antigen challenge. Prevention of asthmatic conditions upon the administration of the compounds is evidenced by a decrease in airway resistance and other, subjective improvements, e.g., reduced cough.

What is claimed is:

1. A method useful for inhibiting the symptoms of the asthmatic condition resulting from an antigen-antibody reaction in a host susceptible to said reaction which comprises administering to said host an effective amount of from about 0.005 mg. to about 100 mg. of body weight per day sufficient to produce said inhibition of a compound of the formula:

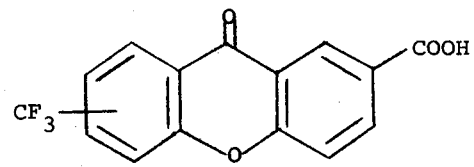

or the pharmaceutically acceptable, non-toxic lower alkyl esters; unsubstituted, monolower alkyl, or dilower alkyl substituted amides or salts thereof.

2. The method according to claim 1 wherein the compound is the 5-trifluoromethyl compound.

3. The method according to claim 1 wherein the compound is the 7-trifluoromethyl compound.

4. The method according to claim 1 wherein the 5-trifluoromethyl compound is 5-trifluoromethylxanthone-2-carboxylic acid.

5. The method according to claim 3 wherein the 7-trifluoromethyl compound is 7-trifluoromethylxanthone-2-carboxylic acid.

6. The method according to claim 1 wherein the compound is the sodium salt.

* * * * *